(12) United States Patent
Kikuchi (10) Patent No.: US 9,383,953 B2
(45) Date of Patent: Jul. 5, 2016

(54) PRINT CONTROL APPARATUS, METHOD FOR CONTROLLING PRINT CONTROL APPARATUS, AND PROGRAM

(71) Applicant: CANON KABUSHIKI KAISHA, Tokyo (JP)

(72) Inventor: Shou Kikuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/140,695

(22) Filed: Dec. 26, 2013

(65) Prior Publication Data

US 2014/0185081 A1    Jul. 3, 2014

(30) Foreign Application Priority Data

Dec. 28, 2012 (JP) .................. 2012-287249

(51) Int. Cl.
G06K 15/00 (2006.01)
G06F 3/12 (2006.01)
H04N 1/00 (2006.01)

(52) U.S. Cl.
CPC ............ *G06F 3/1221* (2013.01); *G06F 3/1229* (2013.01); *G06F 3/1285* (2013.01); *H04N 1/00888* (2013.01); *Y02B 60/1271* (2013.01)

(58) Field of Classification Search
None
See application file for complete search history.

(56) References Cited

U.S. PATENT DOCUMENTS

| | | | |
|---|---|---|---|
| 2004/0258444 A1* | 12/2004 | Okada et al. | 400/76 |
| 2008/0201474 A1* | 8/2008 | Yamada | 709/226 |
| 2009/0207423 A1 | 8/2009 | Shimizu et al. | |
| 2009/0213421 A1* | 8/2009 | Kato et al. | 358/1.15 |
| 2009/0276643 A1* | 11/2009 | Saito | G06F 1/30 713/300 |
| 2009/0300380 A1* | 12/2009 | Vojak et al. | 713/310 |
| 2011/0007339 A1* | 1/2011 | Negishi | 358/1.14 |
| 2011/0058822 A1* | 3/2011 | Shioyasu et al. | 399/8 |
| 2012/0086921 A1* | 4/2012 | Horsfall et al. | 353/85 |
| 2012/0110357 A1 | 5/2012 | Shouno | |
| 2012/0216061 A1 | 8/2012 | Shouno | |
| 2012/0250091 A1* | 10/2012 | Sugishita | 358/1.15 |

FOREIGN PATENT DOCUMENTS

| | | |
|---|---|---|
| CN | 101515976 A | 8/2009 |
| CN | 102215220 A | 10/2011 |
| JP | 2007036318 A | 2/2007 |
| JP | 2008-042880 A | 2/2008 |
| JP | 2008-204120 A | 9/2008 |
| JP | 2011-016284 A | 1/2011 |
| JP | 2011-100246 A | 5/2011 |

* cited by examiner

*Primary Examiner* — Helen Q Zong
(74) *Attorney, Agent, or Firm* — Canon USA, Inc., IP Division (57) ABSTRACT

A print control apparatus capable of communicating with a printing apparatus has a first power mode and a second power mode, and power consumption of the second power mode is lower than power consumption of the first power mode.

32 Claims, 9 Drawing Sheets

PRINT CONTROL APPARATUS, METHOD FOR CONTROLLING PRINT CONTROL APPARATUS, AND PROGRAM

BACKGROUND OF THE INVENTION

1. Field of the Invention

The present invention relates to a print control apparatus, a method for controlling the print control apparatus, and a program.

2. Description of the Related Art

Conventionally, generally, users have switched off power source switches of printing apparatuses to shut down the printing apparatuses.

In recent years, some printing systems have been constructed by connecting a printing apparatus to a print control apparatus, and further connecting the print control apparatus to an information processing apparatus via a network. Among such printing systems, there is a printing system employing a technique called remote shutdown, according to which a user can remotely shut down the printing apparatus and the print control apparatus by issuing a shutdown instruction from the information processing apparatus, as discussed in Japanese Patent Application Laid-Open No. 2007-36318. The employment of the remote shutdown technique allows the user to save a trip all the way to locations where the respective apparatuses are set up to shut down the printing apparatus and the print control apparatus.

However, the technique discussed in Japanese Patent Application Laid-Open No. 2007-36318 has the following problem.

According to the technique discussed in Japanese Patent Application Laid-Open No. 2007-36318, the print control apparatus transmits a shutdown instruction to the printing apparatus upon reception of a shutdown instruction from the information processing apparatus. Then, if the print control apparatus receives no response even after a predetermined time has elapsed after making an inquiry to the printing apparatus about whether the printing apparatus is in operation, the print control apparatus shuts down the print control apparatus itself. Therefore, if the printing apparatus is performing some processing and is in a state that cannot receive the shutdown instruction, only the print control apparatus may be shut down while the printing apparatus may fail to be shut down without the user's noticing it.

SUMMARY OF THE INVENTION

The present invention is directed to a print control apparatus capable of appropriately shutting down a printing apparatus and the print control apparatus according to an instruction from an information processing apparatus.

According to an aspect of the present invention, a print control apparatus capable of communicating with a printing apparatus has a first power mode and a second power mode, and power consumption of the second power mode is lower than power consumption of the first power mode.

Further features of the present invention will become apparent from the following description of exemplary embodiments with reference to the attached drawings.

DESCRIPTION OF THE EMBODIMENTS

Figure 1:
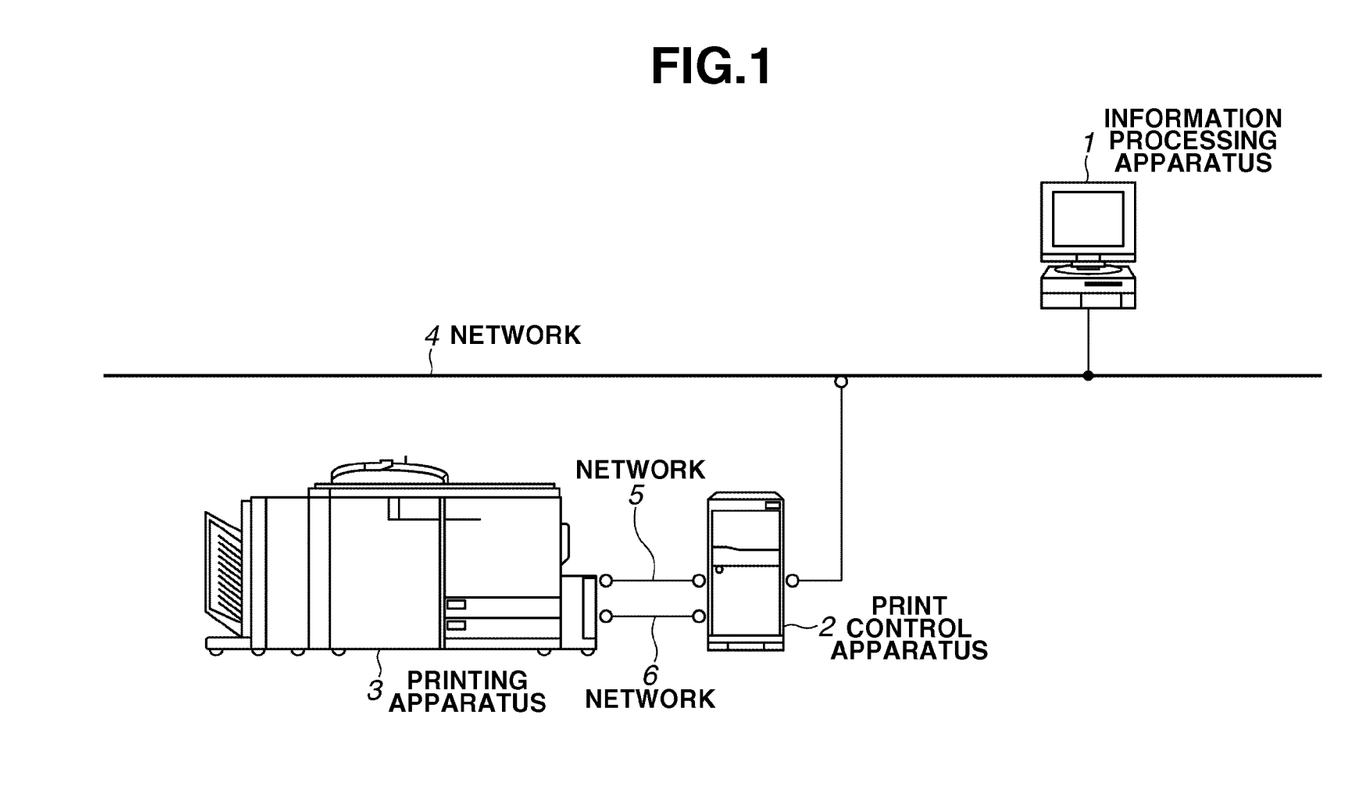
FIG. 1 schematically illustrates a configuration of a printing system according to a first exemplary embodiment.

FIG. 1 schematically illustrates a configuration of a printing system according to a first exemplary embodiment.

An information processing apparatus 1 has a function of editing an application file and issuing a print instruction. A user can check a status of a job, states of a printing apparatus 3 and a print control apparatus 2, and the like by using the information processing apparatus 1. Further, the user can power off the printing apparatus 3 and the print control apparatus 2 by issuing a shutdown instruction from the information processing apparatus 1.

The print control apparatus 2 has various kinds of functions such as image processing, print control, and job management. Further, the print control apparatus 2 receives various kinds of control instructions such as a print job instruction and a shutdown instruction from the information processing apparatus 1, and transfers them to the printing apparatus 3. The print control apparatus 2 is provided between the information processing apparatus 1 and the printing apparatus 3, and is reciprocally capable of communicating with both of them.

The printing apparatus 3 has various kinds of functions such as scanning, printing, and copying.

A network 4 is a network such as a local area network (LAN) and a wide area network (WAN), and connects the print control apparatus 2 and the information processing apparatus 1. When exchanging data and a command, the information processing apparatus 1 indirectly accesses the printing apparatus 3 via the print control apparatus 2, without directly accessing the printing apparatus 3.

A network 5 connects the printing apparatus 3 and the print control apparatus 2, and transfers various kinds of data.

A network 6 connects the printing apparatus 3 and the print control apparatus 2, and mainly transfers image data. The networks 5 and 6 used in connection between the printing apparatus 3 and the print control apparatus 2 may be a single network.

Figure 2:
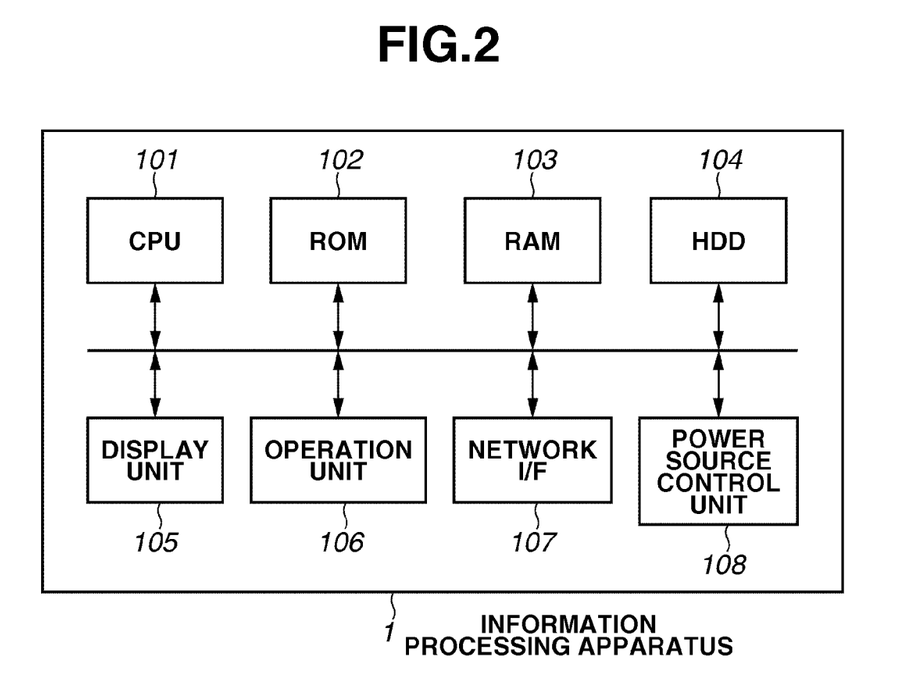
FIG. 2 is a block diagram illustrating a configuration of an information processing apparatus according to the first exemplary embodiment.

FIG. 2 is a block diagram illustrating a configuration of the information processing apparatus 1 according to the first exemplary embodiment.

A central processing unit (CPU) 101 is responsible for whole control of the information processing apparatus 1.

A read only memory (ROM) 102 stores a boot program and the like of the information processing apparatus 1.

A random access memory (RAM) 103 temporarily stores various kinds of data.

A hard disk drive (HDD) 104 stores an operating system (OS), an application program, and the like to be used by the information processing apparatus 1.

A display unit 105 displays various kinds of information to the user.

An operation unit 106 receives various kinds of operations from the user.

A network interface (I/F) 107 performs data communication with an external apparatus.

A power source control unit 108 controls power supply to the respective units of the information processing apparatus 1.

Figure 3:
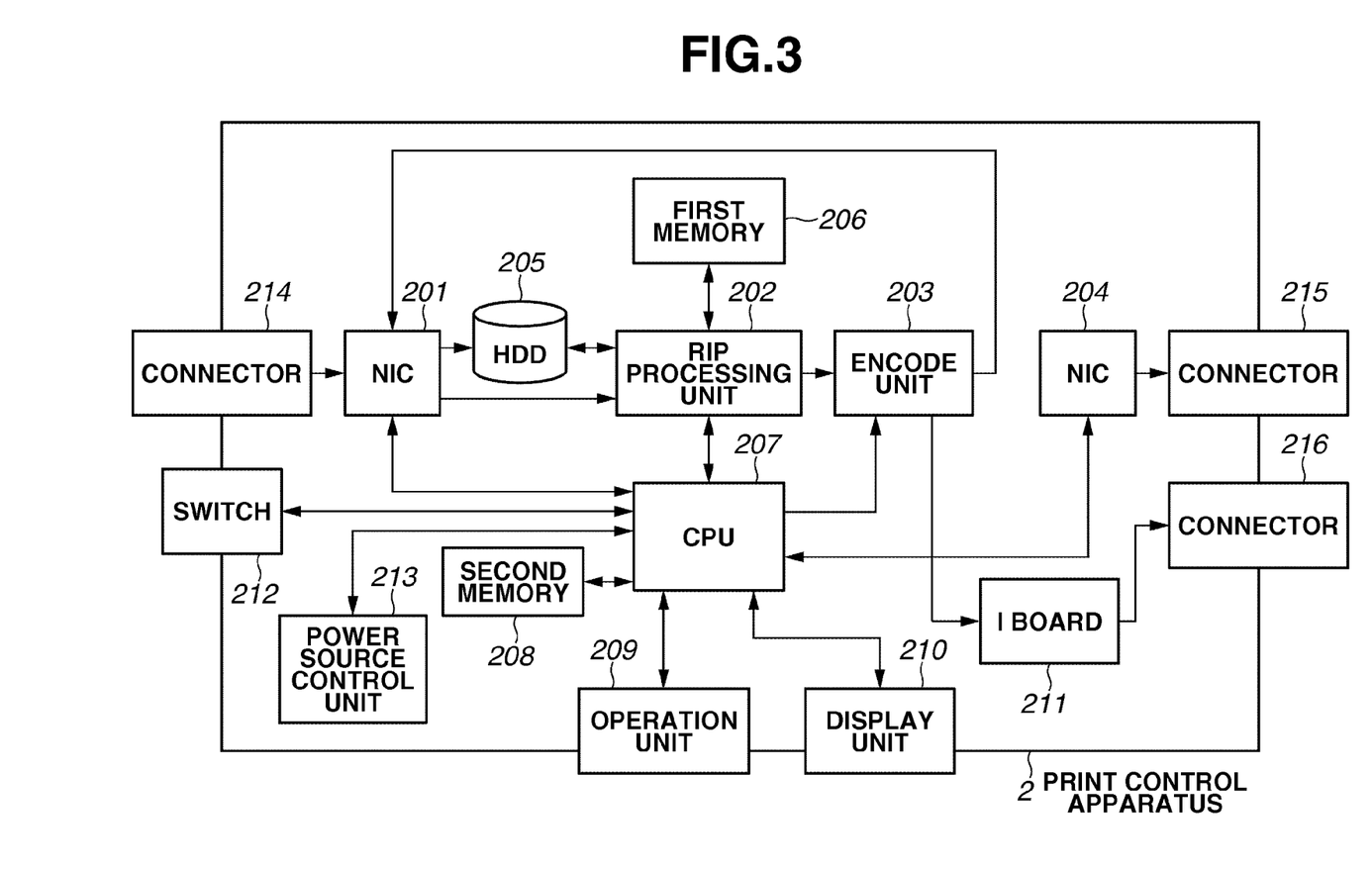
FIG. 3 is a block diagram illustrating a configuration of a print control apparatus according to the first exemplary embodiment.

FIG. 3 is a block diagram illustrating a configuration of the print control apparatus 2 according to the first exemplary embodiment.

A network interface card (NIC) 201 exchanges data between the print control apparatus 2 and the network 4.

A raster image processor (RIP) processing unit 202 rasterizes received print language such as page-description language (PDL), and a specific format data compressed with Joint Bi-Level Image Experts Group (JBIG), or the like into a raster image.

An encode unit 203 converts the rasterized data into print data or any other data in a format supported by the printing apparatus 3.

An NIC 204 exchanges data between the print control apparatus 2 and the network 5.

An HDD 205 is a memory used to temporarily spool the print data received by the NIC 201 or the compressed data processed by RIP.

A first memory 206 is a memory that the RIP processing unit 202 uses for image rasterization processing.

A CPU 207 is responsible for control of the whole print control apparatus 2.

A second memory 208 is a memory that the CPU 207 uses as an area for temporarily storing data.

An operation unit 209 includes a button, a key, a touch panel, and the like, and is used to operate the print control apparatus 2.

A display unit 210 is used to indicate information to the user with an image and characters.

An I board 211 exchanges data between the print control apparatus 2 and the network 6.

A switch 212 receives an instruction to power on/off the print control apparatus 2 from the user. When the switch 212 is operated, an interruption is issued to the CPU 207.

A power source control unit 213 is connected to a commercial power source, and controls power supply to the print control apparatus 2.

A connector 214 connects the print control apparatus 2 to the network 4.

A connector 215 connects the print control apparatus 2 to the network 5.

A connector 216 connects the print control apparatus 2 to the network 6.

Figure 4:
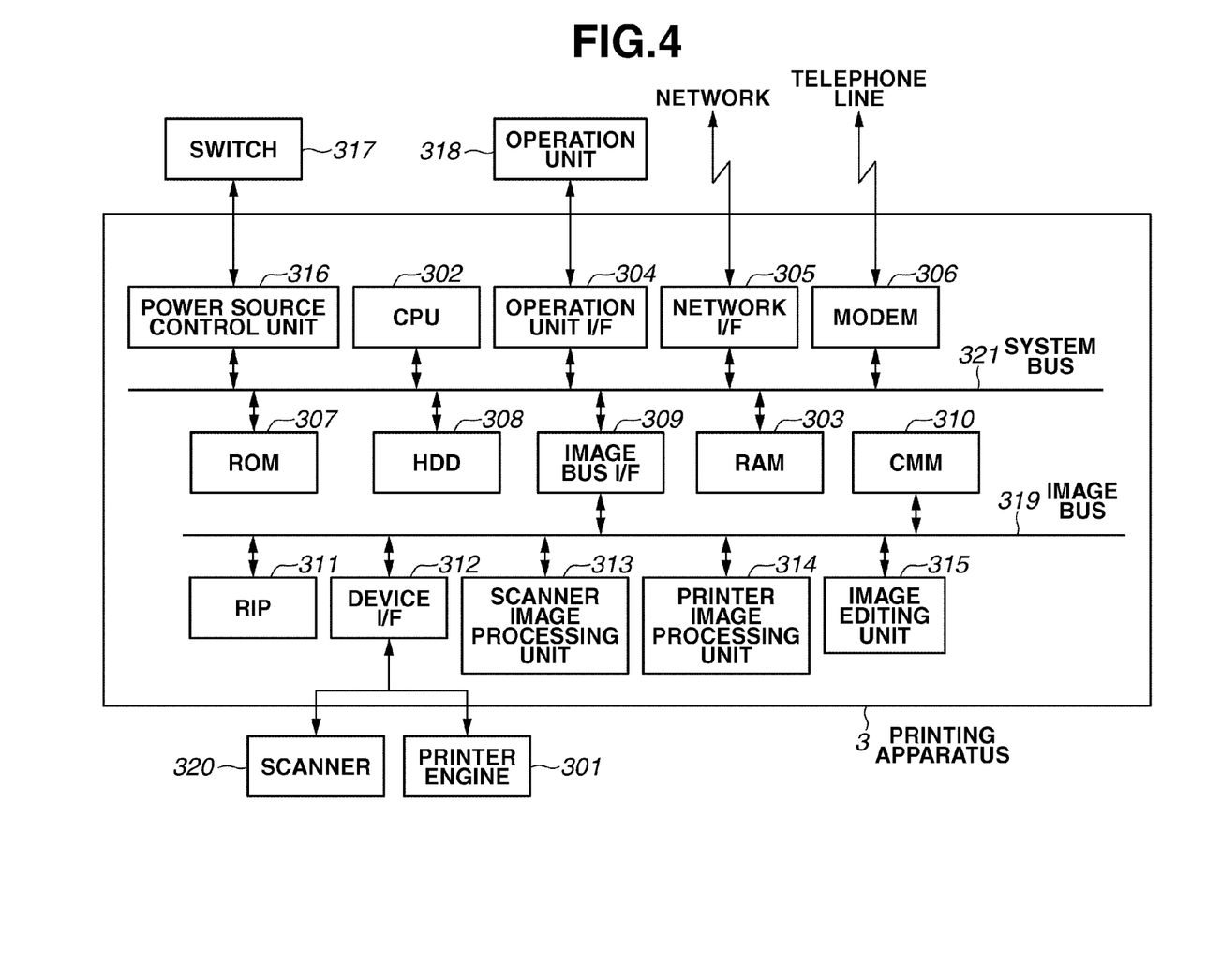
FIG. 4 is a block diagram illustrating a configuration of a printing apparatus according to the first exemplary embodiment.

FIG. 4 is a block diagram illustrating a configuration of the printing apparatus 3 according to the first exemplary embodiment.

A printer engine 301 prints data on a sheet based on image data.

A CPU 302 is a central processing unit for controlling the whole multifunction peripheral (MFP) (the whole printing apparatus 3).

A RAM 303 is a system work memory that allows the CPU 302 to operate, and is also an image memory for temporarily storing input image data.

An operation unit I/F 304 is an interface unit for an operation unit 318 including a display screen that can display image data and the like, and outputs operation screen data to the operation unit 318. Further, the operation unit I/F 304 plays a role of transferring information input by the user through the operation unit 318 to the CPU 302.

A network interface 305 is realized by, for example, a LAN card, and is connected to the network 5 or 6 to input and output information between the printing apparatus 3 and an external apparatus.

A modem 306 is connected to a telephone line, and inputs and outputs information between the printing apparatus 3 and an external apparatus.

A ROM 307 is a boot ROM, and stores a boot program of the system.

An HDD 308 is a hard disk drive, and stores system software for various kinds of processing, input image data, and the like.

An image bus I/F 309 is an interface for connecting a system bus 321 to an image bus 319 that transfers image data at high speed, and is a bus bridge that converts a data structure.

A color management module (CMM) 310 is a dedicated hardware module that performs color conversion processing (also referred to as color space conversion processing) on image data based on a profile and calibration data. The profile is information like a function for converting color image data expressed by a color space dependent on the apparatus into a color space independent from the apparatus (for example, Luminance, a, and b (Lab)). The calibration data is data for correcting a color reproduction characteristic of a scanner 320 and the printer engine 301 of the printing apparatus 3.

A RIP 311 is a raster image processor, and rasterizes PDL into a raster image.

A device I/F unit 312 converts image data between the printing apparatus 3, and the scanner 320 and the printer engine 301 synchronously or asynchronously.

A scanner image processing unit 313 performs various kinds of processing such as correction, processing, and editing on image data input from the scanner 320.

A printer image processing unit 314 performs processing such as correction and conversion of a resolution on image data to be printed and output according to the printer engine 301.

An image editing unit 315 performs various kinds of image processing such as a rotation of image data, and compression/expansion processing of image data.

A power source control unit 316 is connected to the commercial power source, and controls power supply to the printing apparatus 3.

A switch 317 receives an instruction to power on/off the printing apparatus 3 from the user. When the switch 317 is operated, an interruption is issued from the power source control unit 316 to the CPU 302.

The system bus 321 connects the respective components from the CPU 302 to the image bus I/F 309 to one another.

The image bus 319 connects the respective components from the RIP 311 to the image editing unit 315 to one another.

The scanner 320 reads a document to input image data.

Figure 5:
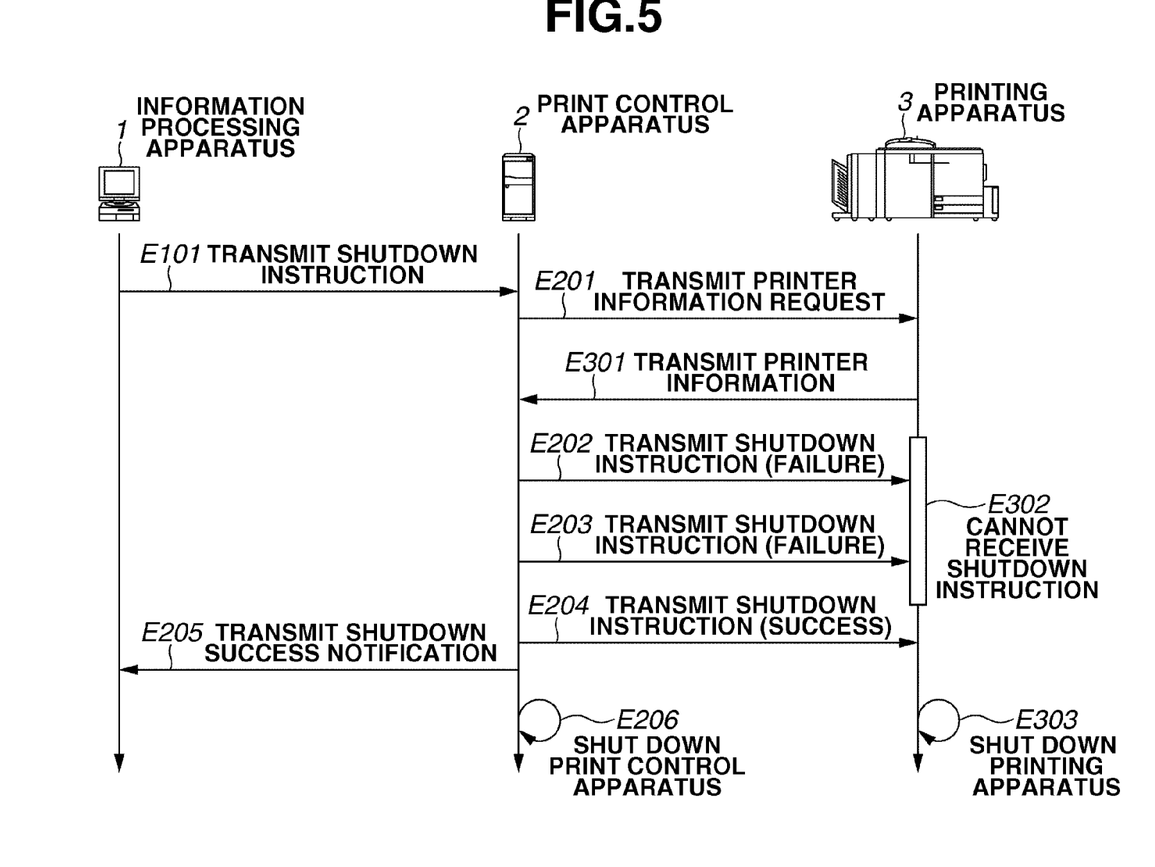
FIG. 5 is a sequence diagram illustrating an operation of the printing system according to the first exemplary embodiment.

FIG. 5 is a sequence diagram illustrating an operation of the printing system according to the first exemplary embodiment.

The information processing apparatus 1 receives an instruction to shut down the print control apparatus 2 and the printing apparatus 3 from the user, whereby this sequence starts.

In step E101, the information processing apparatus 1 transmits a shutdown instruction (a first instruction) to the print control apparatus 2. On the other hand, the print control apparatus 2 receives the shutdown instruction (the first instruction) from the information processing apparatus 1.

In step E201, the print control apparatus 2 transmits a printer information request to the printing apparatus 3. On the other hand, the printing apparatus 3 receives the printer information request from the print control apparatus 2.

In step E301, the printing apparatus 3 transmits printer information to the print control apparatus 2. On the other hand, the print control apparatus 2 receives the printer information from the printing apparatus 3. Then, the print control apparatus 2 determines whether the printing apparatus 3 can be shut down based on the printer information. If the print control apparatus 2 determines that the printing apparatus 3 can be shut down, the print control apparatus 2 performs step E202. If the print control apparatus 2 determines that the printing apparatus 3 cannot be shut down, the print control apparatus 2 transmits a shutdown failure notification to the information processing apparatus 1. Steps E201 and E301 may be performed before step E101.

In state E302, the printing apparatus 3 is in a state that prohibits the printing apparatus 3 from receiving the shutdown instruction.

In step E202, the print control apparatus 2 transmits a shutdown instruction (a second instruction) to the printing apparatus 3. At this time, because the printing apparatus 3 is in the state that prohibits the printing apparatus 3 from receiving the shutdown instruction (the second instruction), the print control apparatus 2 fails in shutting down the printing apparatus 3.

In step E203, the print control apparatus 2 transmits the shutdown instruction (the second instruction) to the printing apparatus 3 again after a predetermined time has elapsed from step E202. At this time, because the printing apparatus 3 is in the state that prohibits the printing apparatus 3 from receiving the shutdown instruction (the second instruction), the print control apparatus 2 also fails in shutting down the printing apparatus 3.

In step E204, the print control apparatus 2 transmits the shutdown instruction (the second instruction) to the printing apparatus 3 again after the predetermined time has elapsed from E203. At this time, because the printing apparatus 3 is in a state that allows the printing apparatus 3 to receive the shutdown instruction (the second instruction), the print control apparatus 2 succeeds in shutting down the printing apparatus 3.

In other words, in steps E202 to E204, the print control apparatus 2 continues transmitting the shutdown instruction to the printing apparatus 3 at a certain interval until the printing apparatus 3 can be shut down.

In step E205, the print control apparatus 2 transmits a shutdown success notification to the information processing apparatus 1. On the other hand, the information processing apparatus 1 receives the shutdown success notification from the print control apparatus 2.

In step E206, the print control apparatus 2 shuts down the print control apparatus 2 itself.

In step E303, the printing apparatus 3 shuts down the printing apparatus 3 itself.

Figure 6:
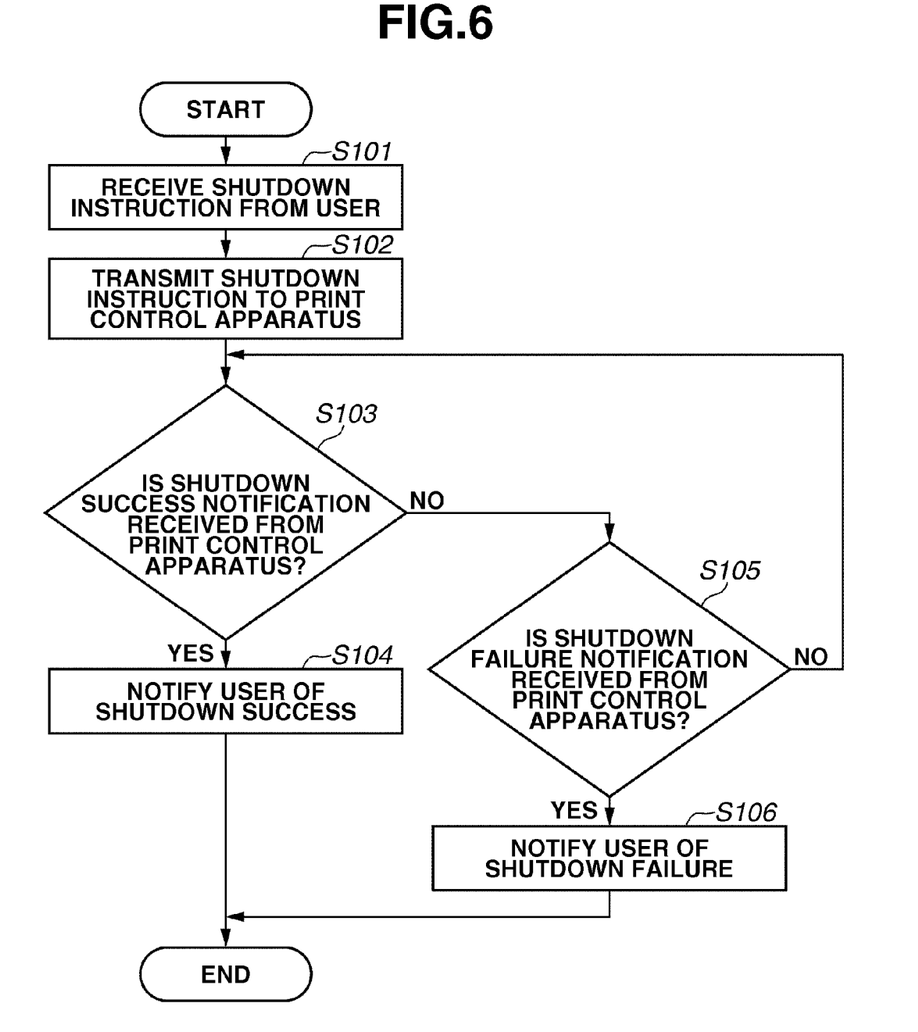
FIG. 6 is a flowchart illustrating an operation of the information processing apparatus according to the first exemplary embodiment.

FIG. 6 is a flowchart illustrating an operation of the information processing apparatus 1 according to the first exemplary embodiment.

The CPU 101 reads out a program from the HDD 104 into the RAM 103 to execute it, whereby this flowchart is realized.

In step S101, the CPU 101 receives the instruction to shut down the print control apparatus 2 and the printing apparatus 3 from the user via the operation unit 106. Examples of possible methods for receiving this instruction include a method in which the user inputs the instruction via a mouse, a keyboard, or a touch panel. However, the CPU 101 may receive the instruction by another method.

In step S102, the CPU 101 transmits the shutdown instruction to the print control apparatus 2 via the network I/F 107. During step S102 to step S104 or step S102 to S106, the CPU 101 may notify the user via the display unit 105 that the print control apparatus 2 and the printing apparatus 3 are currently being shut down.

In step S103, the CPU 101 determines whether the information processing apparatus 1 has received the notification indicating a success in shutting down the print control apparatus 2 and the printing apparatus 3 from the print control apparatus 2 via the network I/F 107. If the CPU 101 determines that the information processing apparatus 1 has received this notification (YES in step S103), the processing proceeds to step S104. If the CPU 101 determines that the information processing apparatus 1 has not received this notification (NO in step S103), the processing proceeds to step S105.

In step S104, the CPU 101 notifies the user via the display unit 105 that shutting down the print control apparatus 2 and the printing apparatus 3 has succeeded. Examples of possible notification methods include displaying characters, an image, or a moving image on a display screen, and issuing a sound or a voice with a speaker. However, the CPU 101 may notify the user of the success by another method.

In step S105, the CPU 101 determines whether the information processing apparatus 1 has received the notification indicating a failure in shutting down the print control apparatus 2 and the printing apparatus 3 from the print control apparatus 2 via the network I/F 107. If the CPU 101 determines that the information processing apparatus 1 has received this notification (YES in step S105), the processing proceeds to step S106. If the CPU 101 determines that the information processing apparatus 1 has not received this notification (NO in step S105), the processing returns to step S103.

In step S106, the CPU 101 notifies the user via the display unit 105 that shutting down the print control apparatus 2 and the printing apparatus 3 has failed. The possible notification methods are the same as those described in step S104.

Figure 7:
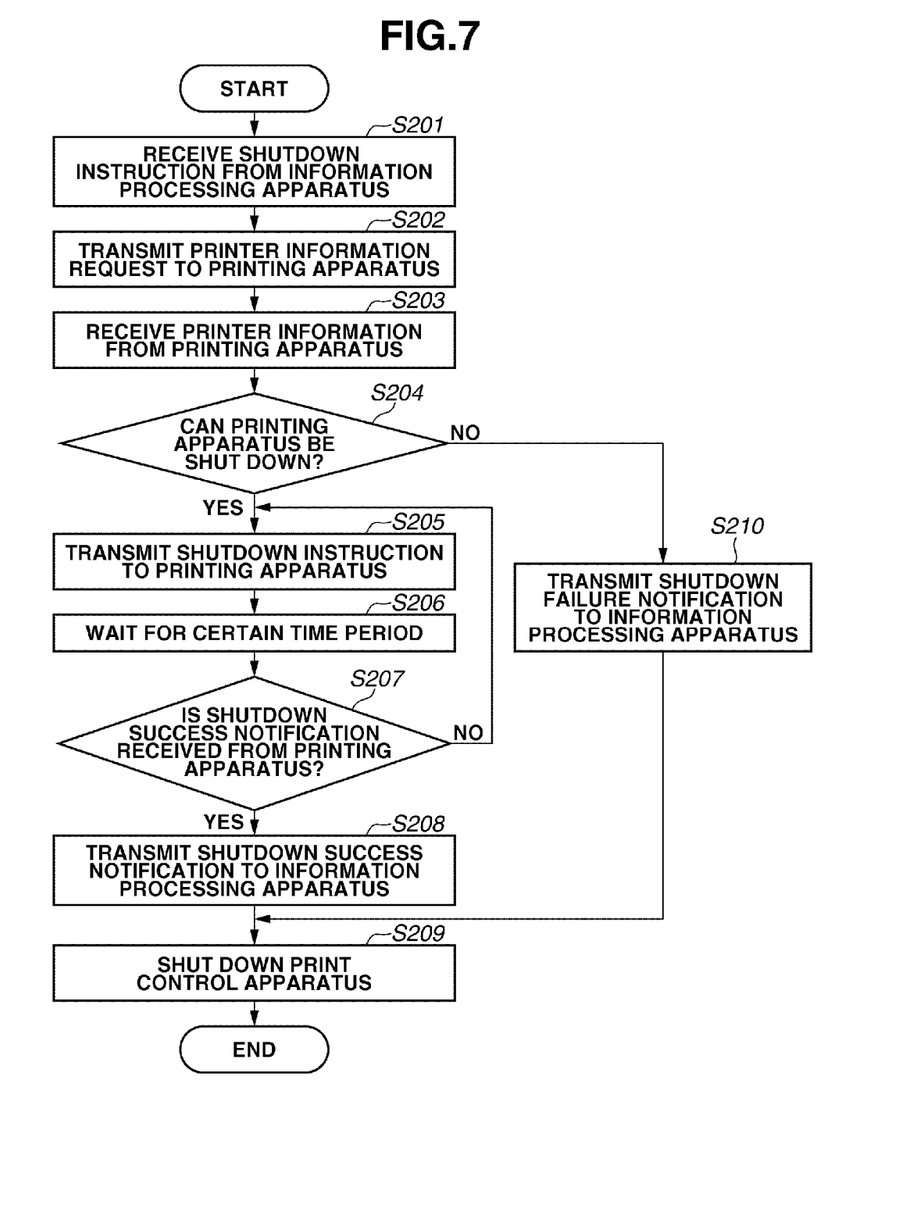
FIG. 7 is a flowchart illustrating an operation of the print control apparatus according to the first exemplary embodiment.

FIG. 7 is a flowchart illustrating an operation of the print control apparatus 2 according to the first exemplary embodiment.

The CPU 207 reads out a program from the HDD 205 into the second memory 208 to execute it, whereby this flowchart is realized.

In step S201, the CPU 207 receives the shutdown instruction from the information processing apparatus 1 via the NIC 201.

In step S202, the CPU 207 transmits the printer information request to the printing apparatus 3 via the NIC 204.

In step S203, the CPU 207 receives the printer information from the printing apparatus 3 via the NIC 204. The printer information includes a status of job processing in the printing apparatus 3, and a setting of the printing apparatus 3 about remote shutdown. Examples of types of the status of job processing include [1] having no job, [2] currently processing a job, [3] having a reserved job, [4] currently cooling the engine, [5] currently backing up data, [6] currently restoring data, and [7] currently upgrading a version of software. Examples of types of the setting about remote shutdown include [8] whether the printing apparatus 3 supports remote shutdown, and [9] whether remote shutdown is set to be allowed or prohibited.

In step S204, the CPU 207 determines, based on the printer information received in step S203, whether the printing apparatus 3 can be shut down. The CPU 207 makes this determination based on the status of job processing in the printing apparatus 3, and the setting of the printing apparatus 3 about remote shutdown in the printer information. If the CPU 207 makes the determination based on the status of job processing, the CPU 207 determines that the printing apparatus 3 can be shut down if the status of job processing is the status [1] among the above-described statuses [1] to [7], while the CPU 207 determines that the printing apparatus 3 cannot be shut down if the status of job processing is any of the statuses [2] to [7]. If the CPU 207 makes the determination based on the setting about remote shutdown, the CPU 207 determines that the printing apparatus 3 can be shut down if the printing apparatus 3 supports remote shutdown in the setting [8], and if remote shutdown is set to be allowed in the setting [9], while the CPU determines that the printing apparatus 3 cannot be shut down if the printing apparatus 3 does not support remote shutdown in the setting [8], and if remote shutdown is set to be prohibited in the setting [9]. If the CPU 207 determines that the printing apparatus 3 can be shut down (YES in step S204), the processing proceeds to step S205. If the CPU 207 determines that the printing apparatus 3 cannot be shut down (NO in step S204), the processing proceeds to step S210.

In step S205, the CPU 207 transmits the shutdown instruction to the printing apparatus 3 via the NIC 204.

In step S206, the CPU 201 waits for a certain time period. This certain time period may be set using a fixed value, or may be arbitrarily settable by a user.

In step S207, the CPU 207 determines whether the print control apparatus 2 has received a shutdown success notification from the printing apparatus 3 via the NIC 204. If the CPU 207 determines that the print control apparatus 2 has received this notification (YES in step S207), the processing proceeds to step S208. If the CPU 207 determines that the print control apparatus 2 has not received this notification (NO in step S207), the processing returns to step S205.

In step S208, the CPU 207 transmits the shutdown success notification to the information processing apparatus 1 via the NIC 201.

In step S209, the CPU 207 shuts down the print control apparatus 2.

In step S210, the CPU 207 transmits the shutdown failure notification to the information processing apparatus 1 via the NIC 201.

Figure 8:
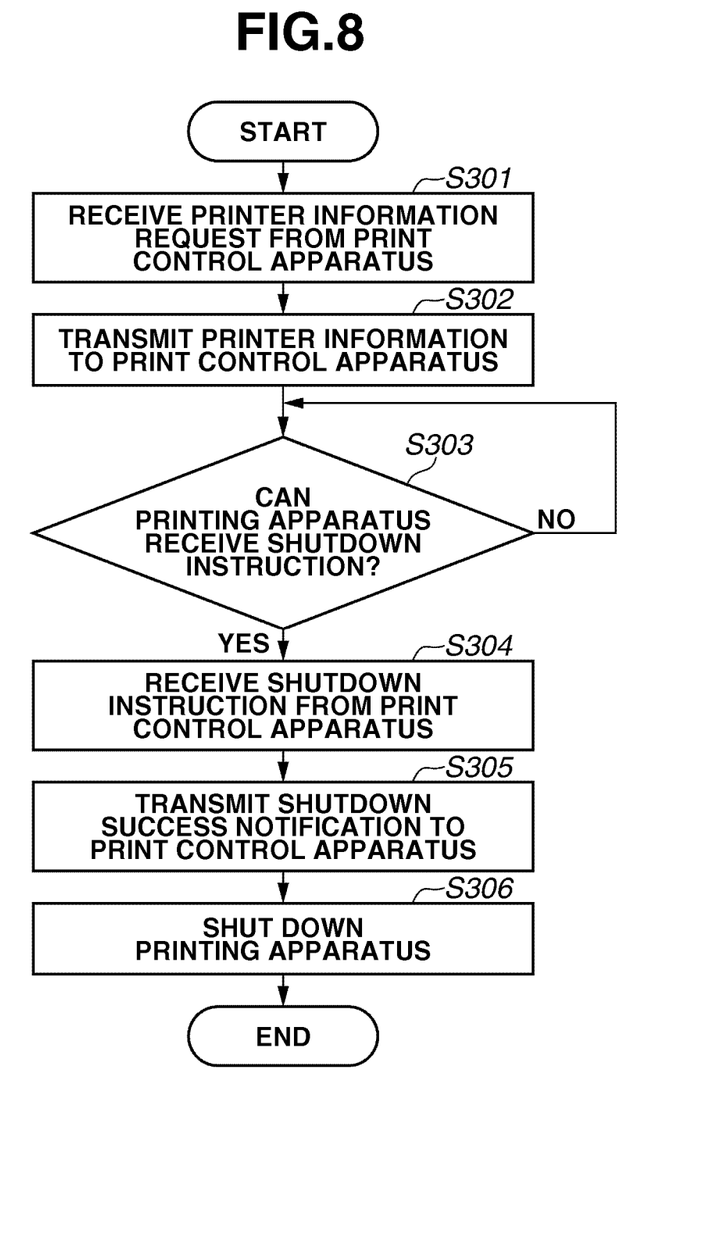
FIG. 8 is a flowchart illustrating an operation of the printing apparatus according to the first exemplary embodiment.

FIG. 8 is a flowchart illustrating an operation of the printing apparatus 3 according to the first exemplary embodiment.

The CPU 302 reads out a program from the HDD 308 into the RAM 303 to execute it, whereby this flowchart is realized.

In step S301, the CPU 302 receives the printer information request from the print control apparatus 2 via the network I/F 305.

In step S302, the CPU 302 transmits the printer information to the print control apparatus 2 via the network I/F 305.

In step S303, the CPU 302 determines whether the printing apparatus 3 can receive the shutdown instruction. The CPU 302 makes this determination based on the status of job processing in the printing apparatus 3, and the setting of the printing apparatus 3 about remote shutdown. If the CPU 302 makes the determination based on the status of job processing, the CPU 302 determines that the printing apparatus 3 can receive the shutdown instruction if the status of job processing is the status [1] among the above-described statuses [1] to [7], while the CPU 302 determines that the printing apparatus 3 cannot receive the shutdown instruction if the status of job processing is any of the statuses [2] to [7]. If the CPU 302 makes the determination based on the setting about remote shutdown, the CPU 302 determines that the printing apparatus 3 can receive the shutdown instruction if the printing apparatus 3 supports remote shutdown in the setting [8], and if remote shutdown is set to be allowed in the setting [9], while the CPU 302 determines that the printing apparatus 3 cannot receive the shutdown instruction if the printing apparatus 3 does not support remote shutdown in the setting [8], and if remote shutdown is set to be prohibited in the setting [9]. If the CPU 302 determines that the printing apparatus 3 can receive the shutdown instruction (YES in step S303), the processing proceeds to step S304. If the CPU 302 determines that the printing apparatus 3 cannot receive the shutdown instruction (NO in step S303), the CPU 302 waits until the printing apparatus 3 becomes able to receive the shutdown instruction.

In step S304, the CPU 302 receives the shutdown instruction from the print control apparatus 2 via the network I/F 305.

In step S305, the CPU 302 transmits the shutdown success notification to the print control apparatus 2 via the network I/F 305.

In step S306, the CPU 207 shuts down the printing apparatus 3.

In this manner, according to the first exemplary embodiment, upon reception of the shutdown instruction from the information processing apparatus 1, the print control apparatus 2 repeatedly transmits the shutdown instruction to the printing apparatus 3 at the predetermined interval until the printing apparatus 3 can be successfully shut down.

As a result, it becomes possible to prevent only the print control apparatus 2 from being shut down with the printing apparatus 3 failing to be shut down.

According to the first exemplary embodiment, upon reception of the shutdown instruction from the information processing apparatus 1, the print control apparatus 2 repeatedly transmits the shutdown instruction to the printing apparatus 3 at the predetermined interval until the printing apparatus 3 can be successfully shut down.

On the other hand, according to a second exemplary embodiment, upon reception of the shutdown instruction from the information processing apparatus 1, the print control apparatus 2 repeatedly transmits the shutdown instruction to the printing apparatus 3 at a predetermined interval until a predetermined time has elapsed. Then, after the predetermined time has elapsed, the print control apparatus 2 performs predetermined processing.

In the following description, the second exemplary embodiment will be described, omitting similar parts to the first exemplary embodiment and focusing different parts from the first exemplary embodiments.

Figure 9:
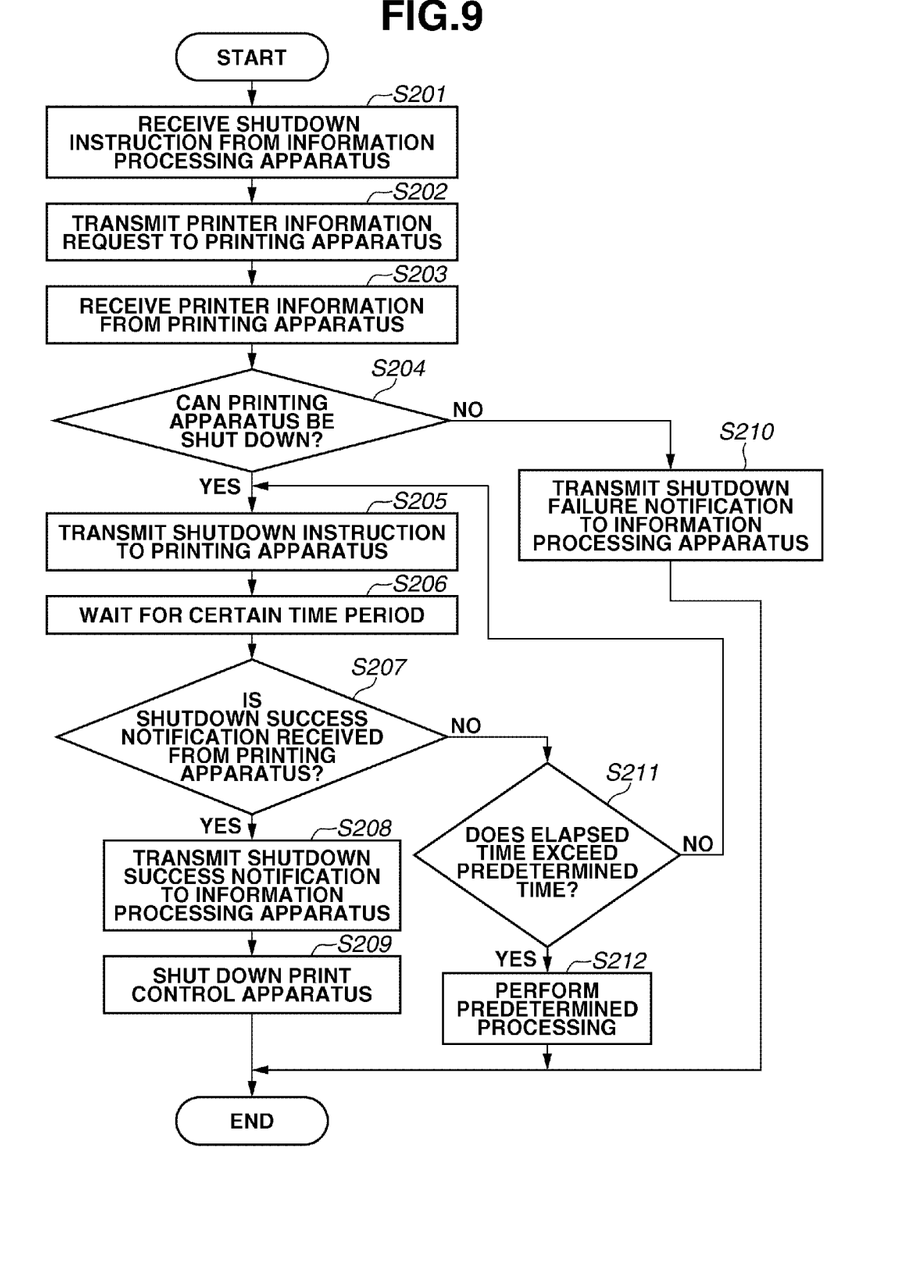
FIG. 9 is a flowchart illustrating an operation of the print control apparatus according to a second exemplary embodiment.

FIG. 9 is a flowchart illustrating an operation of the print control apparatus 2 according to the second exemplary embodiment.

FIG. 9 is a flowchart formed by correcting the different parts from the first exemplary embodiment based on the flowchart of FIG. 7. Common steps to FIG. 7 are identified by the same step numbers. Differences from FIG. 7 are that steps S211 and S212 are newly added.

In step S211, the CPU 207 determines whether an elapsed time from the first execution of step S205 exceeds a predetermined time. This predetermined time is a time period at least longer than the certain time period in step S206. If the CPU 207 determines that the elapsed time exceeds the predetermined time (YES in step S211), the processing proceeds to step S212. If the CPU 207 determines that the elapsed time does not exceeds the predetermined time (NO in step S211), the processing returns to step S205.

In step S212, the CPU 207 performs predetermined processing. Possible candidates of the predetermined processing are the following three kinds of processing. The first processing is processing of forcibly shutting down the printing apparatus 3 and then shutting down the print control apparatus 2. The second processing is processing of shutting down only the print control apparatus 2 without shutting down the printing apparatus 3. The third processing is processing of cancelling shutdown without shutting down the printing apparatus 3 nor the print control apparatus 2.

When the CPU 207 performs the predetermined processing, the print control apparatus 2 may notify the information processing apparatus 1 of the content of the processing. Further, at this time, the print control apparatus 2 may notify the information processing apparatus 1 of the state of the printing apparatus 3.

Further, as the predetermined processing, the print control apparatus 2 may be configured to invariably perform certain one of the above-described plurality of kinds of processing. Alternatively, the print control apparatus 2 may be configured to allow the user to arbitrarily select one from the above-described plurality of kinds of processing. In this case, the print control apparatus 2 may receive a selection of the predetermined processing from the user before step S201, or may receive it immediately before step S212.

In this manner, according to the second exemplary embodiment, upon reception of the shutdown instruction from the information processing apparatus 1, the print control apparatus 2 repeatedly transmits the shutdown instruction to the printing apparatus 3 at the predetermined interval until the predetermined time has elapsed. Then, after the predetermined time has elapsed, the print control apparatus 2 performs the predetermined processing. As a result, it becomes possible to prevent only the print control apparatus 2 from being shut down with the printing apparatus 3 failing to be shut down until the predetermined time has elapsed. Then, after the predetermined time has elapsed, it becomes possible to prevent the user from being kept waiting on standby for shutdown more than that time.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-287249 filed Dec. 28, 2012, which is hereby incorporated by reference herein in its entirety.

What is claimed is:

1. A print control apparatus capable of communicating with a printing apparatus and an information processing apparatus, the print control apparatus comprising a memory and a processor communicating with the memory, the processor configured to implement:
a first reception unit configured to receive a first instruction for shutting down the printing apparatus from the information processing apparatus;
an obtaining unit configured to obtain device information of the printing apparatus from the printing apparatus;
a transmission unit configured to transmit, to the printing apparatus, a second instruction to cause the printing apparatus to shut down the printing apparatus based on the first reception unit receiving the first instruction;
a second reception unit configured to receive, from the printing apparatus, a response to the second instruction transmitted by the transmission unit;
an execution unit configured to shut down the print control apparatus based on the second reception unit receiving the response to the second instruction,
wherein the transmission unit determines, based on the device information of the printing apparatus obtained by the obtaining unit, whether to transmit the second instruction, and transmits the second instruction to the printing apparatus in a case where the transmission unit has determined to transmit the second instruction, and
wherein the device information includes at least one of information indicating a status of job execution in the printing apparatus and information indicating whether the printing apparatus supports remote shutdown; and
a notification unit configured to notify the information processing apparatus that shutdown processing of the printing apparatus has succeeded before the execution unit shuts down the print control apparatus.

2. The print control apparatus according to claim 1, wherein the transmission unit continues transmitting the second instruction at a certain interval.

3. The print control apparatus according to claim 1, wherein the processor implements a determination unit configured to determine whether the printing apparatus can execute the shutdown processing based on the device information of the printing apparatus obtained by the obtaining unit,
wherein the transmission unit transmits the second instruction if the determination unit determines that the printing apparatus can execute the shutdown processing.

4. The print control apparatus according to claim 1, wherein the processor implements another execution unit configured to perform predetermined processing if a predetermined time has elapsed while the printing apparatus does not receive the second instruction.

5. The print control apparatus according to claim 4, wherein the predetermined time is a value set to the print control apparatus in advance.

6. The print control apparatus according to claim 4, wherein the predetermined time is a value set by a user arbitrarily.

7. The print control apparatus according to claim 4, wherein the predetermined processing is shutdown processing of the print control apparatus after forcible execution of the shutdown processing of the printing apparatus.

8. The print control apparatus according to claim 4, wherein the predetermined processing is shutdown processing of the print control apparatus without execution of the shutdown processing of the printing apparatus.

9. The print control apparatus according to claim 4, wherein the predetermined processing is canceling of the shutdown processing of the print control apparatus and the shutdown processing of the printing apparatus.

10. The print control apparatus according to claim 4, wherein the processor implements a selection unit configured to select predetermined processing to be performed from a plurality of kinds of predetermined processing according to a user's instruction.

11. The print control apparatus according to claim 10, wherein the selection unit selects the predetermined processing before the transmission unit transmits the second instruction.

12. The print control apparatus according to claim 10, wherein the selection unit selects the predetermined processing before the another execution unit performs the predetermined processing.

13. A method for controlling a print control apparatus capable of communicating with a printing apparatus and an information processing apparatus, the method comprising:
receiving a first instruction for shutting down the printing apparatus from the information processing apparatus;
obtaining device information of the printing apparatus from the printing apparatus;
transmitting, to the printing apparatus, a second instruction to cause the printing apparatus to shut down the printing apparatus based on the receiving the first instruction;
receiving, from the printing apparatus, a response to the second instruction transmitted in the transmitting step;
shutting down the print control apparatus based on the receiving the response to the second instruction;
determining, based on the device information of the printing apparatus obtained in the obtaining step, whether to transmit the second instruction, and transmitting the second instruction to the printing apparatus in a case where it has been determined to transmit the second instruction; and
notifying the information processing apparatus that shutdown processing of the printing apparatus has succeeded before the shutting down the print control apparatus.

14. A computer-readable storage medium storing a program that causes a print control apparatus capable of communicating with a printing apparatus and an information processing apparatus to execute a method comprising:
receiving a first instruction for shutting down the printing apparatus from the information processing apparatus;
obtaining device information of the printing apparatus from the printing apparatus;
transmitting, to the printing apparatus, a second instruction to cause the printing apparatus to shut down the printing apparatus based on the receiving the first instruction;
receiving, from the printing apparatus, a response to the second instruction transmitted in the transmitting step;
shutting down the print control apparatus based on the receiving the response to the second instruction;
determining, based on the device information of the printing apparatus obtained in the obtaining step, whether to transmit the second instruction, and transmitting the second instruction to the printing apparatus in a case where it has been determined to transmit the second instruction; and
notifying the information processing apparatus that shutdown processing of the printing apparatus has succeeded before the shutting down the print control apparatus.

15. A system comprising a printing apparatus and a print control apparatus capable of communicating with the printing apparatus,
wherein the print control apparatus comprises a memory and a processor in communication with the memory, the processor being configured to implement:
a first reception unit configured to receive a shutdown instruction from an information processing apparatus; and
a first transmission unit configured to transmit an instruction to cause the printing apparatus to execute shutdown processing to the printing apparatus based on receiving of the shutdown instruction by the first reception unit,
wherein the printing apparatus comprises:
a second reception unit configured to receive the instruction transmitted by the first transmission unit;
a first execution unit configured to execute shutdown processing of the printing apparatus based on receiving the instruction by the second reception unit; and
a second transmission unit configured to transmit a response to the instruction, and
wherein the processor of the print control apparatus further implements:
a third reception unit configured to receive the response transmitted by the second transmission unit; and
a second execution unit configured to execute shutdown processing of the print control apparatus based on receiving of the response by the third reception unit and
a notification unit configured to notify the information processing apparatus that shutdown processing of the printing apparatus has succeeded before the second execution unit shuts down the print control apparatus.

16. The print control apparatus according to claim 1, wherein, in a case where the transmission unit has determined not to transmit the second instruction, the transmission unit notifies the information processing apparatus of a shutdown failure of the printing apparatus.

17. The print control apparatus according to claim 1, wherein, in a case where the transmission unit has determined, based on the device information of the printing apparatus obtained by the obtaining unit, not to transmit the second instruction, the transmission unit does not transmit the second instruction to the printing apparatus based on the first reception unit receiving the first instruction.

18. A print control apparatus capable of communicating with a printing apparatus and an information processing apparatus, the print control apparatus comprising a memory and a processor communicating with the memory, the processor configured to implement:
a first reception unit configured to receive a first instruction for shutting down the printing apparatus and the print control apparatus from the information processing apparatus;
an obtaining unit configured to obtain device information of the printing apparatus from the printing apparatus;
a first transmission unit configured to transmit, to the printing apparatus, a second instruction to cause the printing apparatus to shut down the printing apparatus based on the first reception unit receiving the first instruction;

a second reception unit configured to receive, from the printing apparatus, a response to the second instruction transmitted by the first transmission unit;

an execution unit configured to shut down the print control apparatus based on the second reception unit receiving the response to the second instruction;

a second transmission unit configured to determine, based on the device information of the printing apparatus obtained by the obtaining unit, whether the printing apparatus is able to be shut down and, in a case where the printing apparatus is determined not to be able to be shut down, transmit, to the information processing apparatus, information indicating a shutdown failure of the printing apparatus; and a notification unit configured to notify, before the execution unit shuts down the print control apparatus, the information processing apparatus that shutdown processing of the printing apparatus has succeeded.

19. The print control apparatus according to claim 18, wherein the first transmission unit continues transmitting the second instruction at a certain interval.

20. The print control apparatus according to claim 18, wherein the device information includes at least one of information indicating a status of job execution in the printing apparatus and information indicating whether the printing apparatus supports remote shutdown.

21. The print control apparatus according to claim 18, wherein the processor implements an another execution unit configured to perform predetermined processing if a predetermined time has elapsed while the second reception unit does not receive the response.

22. The print control apparatus according to claim 21, wherein the predetermined time is a value set to the print control apparatus in advance.

23. The print control apparatus according to claim 21, wherein the predetermined time is a value set by a user arbitrarily.

24. The print control apparatus according to claim 21, wherein the predetermined processing is shutdown processing of the print control apparatus after forcible execution of shutdown processing of the printing apparatus.

25. The print control apparatus according to claim 21, wherein the predetermined processing is shutdown processing of the print control apparatus without execution of shutdown processing of the printing apparatus.

26. The print control apparatus according to claim 21, wherein the predetermined processing is processing of canceling shutdown processing without causing both of the printing apparatus and the print control apparatus to shut down.

27. The print control apparatus according to claim 21, wherein the processor implements a selection unit configured to select predetermined processing to be performed from a plurality of kinds of predetermined processing according to a user's instruction.

28. The print control apparatus according to claim 27, wherein the selection unit selects the predetermined processing before the first reception unit receives the first instruction.

29. The print control apparatus according to claim 27, wherein the selection unit selects the predetermined processing before the another execution unit performs the predetermined processing.

30. The print control apparatus according to claim 18, wherein, in a case where the first transmission unit determines, based on the device information of the printing apparatus obtained by the obtaining unit, that the printing apparatus is not able to be shut down, the first transmission unit does not transmit the second instruction to the printing apparatus based on the first reception unit receiving the first instruction.

31. A system comprising a printing apparatus and a print control apparatus capable of communicating with the printing apparatus and an information processing apparatus, wherein the print control apparatus comprises a memory and a processor in communication with the memory, the processor being configured to implement:

a first reception unit configured to receive a first instruction for shutting down the printing apparatus and the print control apparatus from the information processing apparatus;

an obtaining unit configured to obtain device information of the printing apparatus from the printing apparatus; and a first transmission unit configured to transmit, to the printing apparatus, a second instruction to cause the printing apparatus to shut down the printing apparatus based on the first reception unit receiving the first instruction, wherein the printing apparatus comprises:

a receiving unit configured to receive the second instruction transmitted by the first transmission unit; and a second transmission unit configured to transmit a response to the second instruction received by the receiving unit, wherein the print control apparatus further comprises:

a second reception unit configured to receive the response to the second instruction transmitted by the second transmission unit;

an execution unit configured to execute shutdown processing of the print control apparatus based on the second reception unit receiving the response to the second instruction, and wherein the first transmission unit determines, based on the device information of the printing apparatus obtained by the obtaining unit, whether to transmit the second instruction, and transmits the second instruction to the printing apparatus in a case where the first transmission unit has determined to transmit the second instruction; and the processor implements a notification unit configured to notify, before the execution unit shuts down the print control apparatus, the information processing apparatus that shutdown processing of the printing apparatus has succeeded.

32. A system comprising a printing apparatus and a print control apparatus capable of communicating with the printing apparatus and an information processing apparatus, wherein the print control apparatus comprises a memory and a processor in communication with the memory, the processor being configured to implement:

a first reception unit configured to receive a first instruction for shutting down the printing apparatus and the print control apparatus from the information processing apparatus;

an obtaining unit configured to obtain device information of the printing apparatus from the printing apparatus;

a first transmission unit configured to transmit, to the printing apparatus, a second instruction to cause the printing apparatus to shut down the printing apparatus based on the first reception unit receiving the first instruction, wherein the printing apparatus comprises:

a receiving unit configured to receive the second instruction transmitted by the first transmission unit; and
a second transmission unit configured to transmit a response to the second instruction received by the receiving unit,
wherein the print control apparatus further comprises:
a second reception unit configured to receive the response to the second instruction transmitted by the second transmission unit;
an execution unit configured to execute shutdown processing of the print control apparatus based on the second reception unit receiving the response to the second instruction;
the processor further implements:
a third transmission unit configured to determine, based on the device information of the printing apparatus obtained by the obtaining unit, whether the printing apparatus is able to be shut down and, in a case where the printing apparatus is determined not to be able to be shut down, transmit, to the information processing apparatus, information indicating a shutdown failure of the printing apparatus; and
a notification unit configured to notify, before the execution unit shuts down the print control apparatus, the information processing apparatus that shutdown processing of the printing apparatus has succeeded.

* * * * *